US 8,989,519 B2

United States Patent
Irani et al.

(10) Patent No.: US 8,989,519 B2
(45) Date of Patent: Mar. 24, 2015

(54) SUPER RESOLUTION FROM A SINGLE SIGNAL

(75) Inventors: Michal Irani, Rehovot (IL); Daniel Glasner, Rehovot (IL); Oded Shahar, Tel Aviv (IL); Shai Bagon, Rehovot (IL)

(73) Assignee: Yeda Research & Development Co. Ltd., Rehovot (IL)

( * ) Notice: Subject to any disclaimer, the term of this patent is extended or adjusted under 35 U.S.C. 154(b) by 449 days.

(21) Appl. No.: 13/138,894

(22) PCT Filed: Apr. 20, 2010

(86) PCT No.: PCT/IB2010/051738
§ 371 (c)(1),
(2), (4) Date: Dec. 25, 2011

(87) PCT Pub. No.: WO2010/122502
PCT Pub. Date: Oct. 28, 2010

(65) Prior Publication Data
US 2012/0086850 A1    Apr. 12, 2012

Related U.S. Application Data

(60) Provisional application No. 61/170,884, filed on Apr. 20, 2009, provisional application No. 61/313,837, filed on Mar. 15, 2010.

(51) Int. Cl.
| G06K 9/32 | (2006.01) |
| G09G 5/00 | (2006.01) |
| G06T 3/40 | (2006.01) |

(52) U.S. Cl.
CPC .............. G06T 3/4053 (2013.01); G06T 3/40 (2013.01); *G09G 2340/0407* (2013.01)

USPC .......................................... 382/299; 345/660

(58) Field of Classification Search
CPC . G06T 3/4053; G06T 3/40; G09G 2340/0407
USPC .......................................... 382/299; 345/660
See application file for complete search history.

(56) References Cited

U.S. PATENT DOCUMENTS

| 7,428,019 B2 * | 9/2008 | Irani et al. ............... 348/581 |
| 7,688,363 B2 * | 3/2010 | Sato et al. ............... 348/240.2 |

(Continued)

OTHER PUBLICATIONS

William T. Freeman et al. (Eample-Based Super-Resolution, IEEE, 2002, pp. 56-65).*

(Continued)

*Primary Examiner* — Kanjibhai Patel
(74) *Attorney, Agent, or Firm* — Eitan, Mehulal & Sadot

(57) ABSTRACT

A method implementable on a computing device includes exploiting data redundancy to combine high frequency information from at least two different scales of an input signal to generate a super resolution version of said input signal. An alternative method includes exploiting recurrence of data from an input signal in at least two different scales of at least one reference signal to extract and to combine high frequency information from a plurality of scales of said at least one reference signal to generate a super resolution version of said input signal. An alternative method includes generating a super resolution version of a single input video sequence in at least the temporal dimension by exploiting data recurrence within the input video sequence or with respect to an external database of example video sequences. A signal may be an image, a video sequence, an audio signal, etc.

51 Claims, 8 Drawing Sheets

(56) References Cited

U.S. PATENT DOCUMENTS

| | | | |
|---|---|---|---|
| 7,715,658 B2 * | 5/2010 | Cho et al. | 382/299 |
| 8,090,220 B2 * | 1/2012 | Douglas et al. | 382/299 |
| 8,233,541 B2 * | 7/2012 | Liu | 375/240.16 |
| 8,306,121 B2 * | 11/2012 | Jia | 375/240.16 |
| 8,345,158 B2 * | 1/2013 | Robertson et al. | 348/459 |
| 8,369,649 B2 * | 2/2013 | Nagumo | 382/275 |
| 2005/0057687 A1 | 3/2005 | Irani et al. | |
| 2006/0013332 A1 | 1/2006 | Rayburn | |
| 2007/0296833 A1 | 12/2007 | Corcoran et al. | |
| 2008/0240503 A1 | 10/2008 | Okada et al. | |
| 2009/0046952 A1 | 2/2009 | Ben-Ezra et al. | |

OTHER PUBLICATIONS

Qiang Wang et al. (Patch Based Blind Image Super Resolution, IEEE, 2005, pp. 1-8).*

International search report for PCT/IB 10/51738 dated Sep. 24, 2010.

* cited by examiner

SUPER RESOLUTION FROM A SINGLE SIGNAL

CROSS-REFERENCE TO RELATED APPLICATIONS

The present application is a US National Phase of PCT Application No. PCT/IB2010/051738, filed on Apr. 20, 2010, which claims the benefit under 35 U.S.C. 119(e) of U.S. Provisional Application 61/170,884 filed Apr. 20, 2009 and 61/313,837 filed Mar. 15, 2010, the disclosure of which is incorporated herein by reference.

FIELD OF THE INVENTION

The present invention relates to signal processing generally and to super-resolution of signals in particular.

BACKGROUND OF THE INVENTION

The goal of super-resolution methods is to recover a high resolution signal from one or more low resolution input signals. Methods for super-resolution of images can be broadly classified into two families of methods: the classical multi-image super-resolution and example-based super-resolution.

Reference is now made to FIG. 1, which generally illustrates the two types of methods.

In classical multi-image super-resolution such as described in Michal Irani and Shmuel Peleg, "Improving resolution by image registration", *CVGIP: Graphical Model and Image Processing*, Vol. 53, (3), 1991, pp 231-239, Capel, David, "Image Mosaicing and Super-Resolution", *Springer Verlag*, 2004, and Farsiu, S., Robinson, M D, Elad, M. and Milanfar, P., "Fast and robust multiframe super resolution", *IEEE Transactions on Image Processing*, Vol. 13, (10), 2004, pp 1327-1344, a set of low-resolution images $L_i$ of the same scene are taken, at sub pixel misalignments, and the method attempts to generate a high-resolution image H from the multiple low-resolution images $L_i$.

Each pixel p of the low resolution image $L_j$ is assumed to be generated from high resolution image H by a blurring function $B_j$ and a sub-sampling process $s_j$, as given by Equation 1.

$$L_j = (H * B_j) \downarrow_{s_j} \qquad \text{Equation 1}$$

Thus, each low resolution pixel p in each low resolution image induces one linear constraint on the unknown high-resolution intensity values within a local neighborhood R around its corresponding high-resolution pixel q, where the size of the neighborhood is determined by the "support" of the blur kernel $B_j$:

$$L_j(p) = (H * B_j)(q) = \sum_{q_i \in Support(B_j)} H(q_i) B_j(q_i - q) \qquad \text{Equation 2}$$

where $H(q_i)$ are the unknown high-resolution intensity values and $B_j$ is the blur kernel relating high resolution image H with low resolution image $L_j$. Thus, region $R_j(p)$, the region which affects pixel p in image $L_j$, is a function of p, the alignment between $L_j$ and H at sub-pixel accuracy and the blur kernel $B_j$. A blurring function may be a point spread function and the amount of blur typically is a function of the extent of the sub-sampling, where the more the sub-sampling, the larger the blur.

Thus, each pixel $L_i(p)$ of low resolution image $L_i$ imposes a constraint on local region $R_i(p)$. If enough low-resolution images are available (at subpixel shifts from each other), then the set of equations becomes determined and can be solved to recover the high-resolution image.

Such super-resolution schemes have been shown to provide reasonably stable results up to a factor of about 2, but are limited in the presence of noise and misregistration. These limitations have lead to the development of "Example-Based Super-Resolution" introduced in articles by Freeman, W. T. and Pasztor, E. C. and Carmichael, O. T., "Learning low-level vision", *International Journal of Computer Vision*, Vol. 40 (1), 2000, Springer, pp 25-47, Freeman, William T., Jones, Thouis R. and Pasztor, Egon C., "Example-Based Super-Resolution", *IEEE Comput. Graph. Appl.*, Vol. 22, March 2002, (2), pp. 56-65, and Simon Baker and Takeo Kanade, "Limits on super-resolution and how to break them", *IEEE Transactions on Pattern Analysis and Machine Intelligence*, 2002, Vol. 24, pp. 1167-1183 and extended later by others.

In example-based super-resolution, pairs of corresponding images L and H (generally with a relative scale factor of 2) are stored in a database 10, where example images $LE_i$ are of low-resolution and example images HE are their high resolution version. It is also common to store examples which have a scale gap which is the same as the scale gap between the desired high resolution image and the input low-resolution image. For each patch PT in the input low resolution image L, a similar patch LE(PT) is found in one of the low-resolution example images $LE_i$ in database 10. A corresponding high-resolution patch HE(PT) is then copied to the unknown high-res image H at the appropriate location.

Example-based super-resolution thus utilizes the known correspondences between low resolution and high resolution image patches in database 10. Higher super-resolution factors have often been obtained by repeated applications of this process.

It is important to distinguish between image interpolation (or image zooming) and super-resolution. In image interpolation, the goal is to magnify (scale-up) an image while maintaining the sharpness of the edges and the details in the image. In contrast, in super-resolution the goal is to recover new (i.e. missing) high-resolution details beyond the Nyquist frequency of the low-resolution image that are not explicitly found in any individual low-resolution image. In classical super-resolution, this high-frequency information is assumed to be split across multiple low-resolution images, implicitly found there in aliased form. In example-based super-resolution, this missing high-resolution information is assumed to be available in the high-resolution database patches, and is learned from the low-resolution/high-resolution pairs of examples in the database.

SUMMARY OF THE INVENTION

There is therefore provided, in accordance with an embodiment of the invention, a method implementable on a computing device. The method includes exploiting data redundancy to combine high frequency information from at least two different scales of an input signal to generate a super resolution version of the input signal.

There is also provided, in accordance with an embodiment of the invention, a method implementable on a computing device which includes exploiting recurrence of data from an input signal in at least two different scales of at least one reference signal to extract and to combine high frequency information from a plurality of scales of the at least one reference signal to generate a super resolution version of the input signal.

Moreover, in accordance with an embodiment of the invention, the at least one reference signal is the input signal.

Further, in accordance with an embodiment of the invention, the at least one reference signal may be either the input or a transformed version of the input signal. The transformations may be rotation, reflection, downscaling, upscaling, similarity transformation, affine transformation, projective transformation, a color transformation, an intensity transformation, any geometric transformation or any function applied to the input signal.

Still further, in accordance with an embodiment of the invention, the at least one reference signal may be an intermediate resolution signal obtained as an intermediate result from the input signal.

Alternatively, in accordance with an embodiment of the invention, the signals may be an image, a video sequence, an fMRI sequence, an audio signal, an ultrasound signal, MRI signal, CT signal, radar signal, range sensor signal, electrical signal, medical signal or an N-dimensional signal (where $N=1, 2, 3, 4, \ldots$).

Moreover, in accordance with an embodiment of the invention, the exploiting includes using patches to find repetitive patch information, such as patch colors, patch intensities, patch Laplacians, high-pass filtered versions of the patch, low-pass filtered versions of the patch, band-pass filtered versions of the patch, patch descriptors or any function applied to the patch.

Further, in accordance with an embodiment of the invention, the patches are smaller in at least one dimension than the input signal. For example, the patches may be image patches, spatio-temporal video patches, spatial video patches, temporal video patches or n-dimensional signal patches in an N-dimensional signal (where $N=1, 2, 3, 4, \ldots$ and $n \le N$).

Still further, in accordance with an embodiment of the invention, each of the scales may be a spatial scale, a temporal scale, a scale along a dimension in an N-dimensional signal, a color scale, an intensity scale, a dynamic range scale or a spectral range scale.

Additionally, in accordance with an embodiment of the invention, the exploiting utilizes data recurrence within the input scale of the input signal and across at least one scale downscale from the input scale.

Moreover, in accordance with an embodiment of the invention, at least one of the different scales has a scale gap relative to the input scale of the input signal which is different than the scale gap between the input scale and the output scale of the super-resolution version of the input signal. The at least one of the different scales may have a non-dyadic scale gap relative to the input scale of the input signal.

Further, in accordance with an embodiment of the invention, the exploiting includes for each input patch in at least a part of the input signal, finding at least one matching patch within a plurality of scaled versions of the input signal and solving for a high-resolution signal. The solving includes recovering intermediate-resolution details of at least one intermediate up-scaled version of the input signal, the details being extracted from at least one higher-scale parent patch of at least one of the matching patches and bridging the gap between the intermediate-resolution scale and a high-resolution scale of the high-resolution signal.

Still further, in accordance with an embodiment of the invention, the method includes transforming either the patch or at least one matching patch as part of finding similarity of patch information. Such a transformation might be by rotation, translation, reflection, scaling, similarity, affine and projective, color transformation or intensity transformation.

Moreover, in accordance with an embodiment of the invention, the details might be from the parent patch, a Laplacian of the parent patch, a high-pass filtered version of the parent patch, a weighted average of a plurality of parent patches, a weighted average of a plurality of filtered versions of parent patches, colors of the parent patch, intensities of the parent patch or a band-pass filtered version of the parent patch.

Additionally, in accordance with an embodiment of the invention, the bridging includes solving equations relating the high-resolution scale to the intermediate-resolution scale. The solving may include weighting each of the equations according to the degree of similarity of the input patch to the matching patch.

Moreover, in accordance with an embodiment of the invention, the high-resolution signal may be the super-resolution version of the input signal or an intermediate-resolution version of the input signal between the scale of the input signal and the scale of the super-resolution version of the input signal.

Further, in accordance with an embodiment of the invention, the exploiting includes coarse-to-fine repetitions of the finding and solving. The scale of the high-resolution signal ranges from the input scale of the input signal to the scale of the super-resolution version of the input signal. At each repetition, the high-resolution signal may be added to the at least one reference signal. In one case, the intermediate-resolution scale may be the high-resolution scale.

Still further, in accordance with an embodiment of the invention, the equations are a function of a blur kernel associated with the scale gap between the high-resolution scale and the intermediate scale. The equations may also be a function of a residual sub-unit misalignment in at least one dimension between the input patch and the at least one matching patch.

Moreover, in accordance with an embodiment of the invention, the blur kernel may be a point spread function of a sensor, a Gaussian blur, a low-pass filter or an exposure-time function of a video camera. Alternatively, in accordance with an embodiment of the invention, the blur kernel may be estimated from matched patches across scales.

Still further, in accordance with an embodiment of the invention, the super-resolution provides an increase in spatial resolution, temporal resolution, color resolution, intensity resolution, dynamic range, spectral range or at least one dimension of the input signal.

Additionally, in accordance with an embodiment of the invention, the super-resolution version of the input signal may be used for signal up-sampling, digital zoom-in, viewing in slow-motion, increasing dynamic-range, changing aspect ratio, changing frame-rate, as part of digital-to-analog conversion, image compression, signal compression, video compression, guided signal acquisition to maximize resolution after processing, guided acquisition of medical signals to decrease radiation, signal format conversion, extracting new samples of the input signal, reducing blur or reducing aliasing.

There is also provided, in accordance with an embodiment of the invention, a method implementable on a computing device which includes generating a super resolution version of a single input video sequence in at least the temporal dimension.

Further, in accordance with an embodiment of the invention, the generating includes adding new video frames to reduce at least one of: motion aliasing and motion blur.

Still further, in accordance with an embodiment of the invention, the generating includes exploiting recurrence of data from the input video sequence in at least one scale of at least one reference video sequence to recover at least high temporal frequency information from the at least one reference video sequence. The at least one reference video sequence is not obtained by a different simultaneous recording of the same scene. It may be the input video sequence and it may be a transformed version of the input video sequence, such as by rotation, reflection, downscaling, upscaling, similarity transformation, affine transformation, projective transformation, a color transformation, an intensity transformation, any geometric transformation or a function applied to the input video sequence.

Moreover, in accordance with an embodiment of the invention, the at least one reference video sequence may be an intermediate resolution video sequence generated from the input video sequence.

Furthermore, in accordance with an embodiment of the invention, the exploiting includes using patches to find repetitive patch information, such as patch colors, patch intensities, patch Laplacians, filtered versions of the patch, patch descriptors or any function applied to the patch.

Still further, in accordance with an embodiment of the invention, the at least one scale may be at least one of: a spatial scale, a temporal scale, an input scale of the input video sequence, a color scale, an intensity scale, a dynamic range scale, a spectral range scale, and a non-dyadic scale gap relative to the input scale in at least one of space and time.

Moreover, in accordance with an embodiment of the invention, the exploiting includes for each input patch in at least a part of the input video sequence, finding at least one matching patch within the at least one reference video sequence or the scaled version of the at least one reference video sequence and recovering at least high temporal frequency information from the matching patches to generate the super resolution version of the input video sequence.

Further, in accordance with an embodiment of the invention, the recovering includes extracting at least high temporal frequency information from at least one higher scale parent patch of the at least one matching patch.

Moreover, in accordance with an embodiment of the invention, the recovering includes finding the at least one matching patch at sub-frame misalignment accuracy and solving equations based on the sub-frame misalignment and/or a blur function relating a high resolution scale to the scale of at least one of the input patch and the matching patch.

Additionally, in accordance with an embodiment of the invention, the method also includes transforming the patch and/or the at least one matching patch as part of finding similarity of patch information. For example, the transformation may be rotation, translation, scaling, reflection, similarity, affine, projective, color transformation or intensity transformation.

Moreover, in accordance with an embodiment of the invention, the super-resolution version of the input video sequence may be used for frame rate conversion, as part of digital to analog conversion, video compression, temporal zoom-in, guided video acquisition to maximize resolution after processing, extracting new intermediate frames of the input video, reducing blur, reducing temporal aliasing or reducing motion aliasing. For example, the super resolution version may be a slow motion version or an up-sampled version.

Still further, in accordance with an embodiment of the invention, the finding includes performing an approximate nearest neighbor search.

There is also provided, in accordance with an embodiment of the invention, a method implementable on a computing device which includes obtaining at least temporal super-resolution of an input video sequence using recurrence of data from the input video sequence found within an external database of examples of low-resolution/high-resolution pairs of video sequences.

There is also provided, in accordance with an embodiment of the invention, apparatus including a receiver to receive an input signal and a super resolution generator to exploit data redundancy in the input signal and to combine high frequency information from at least two different scales of the input signal to generate a super resolution version of the input signal.

There is still further provided, in accordance with an embodiment of the invention, apparatus including a receiver to receive an input signal and a super resolution generator to exploit recurrence of data from the input signal in at least two different scales of at least one reference signal to extract and to combine high frequency information from a plurality of scales of the at least one reference signal to generate a super resolution version of the input signal.

There is still further provided, in accordance with an embodiment of the invention, apparatus including a receiver to receive a single input video sequence and a super resolution generator to generate a super resolution version of the single input video sequence in at least the temporal dimension.

Moreover, in accordance with an embodiment of the invention, the generator exploits recurrence of data from said single input video sequence in at least one scale of at least one of: said single input video sequence and at least one reference video sequence which is not a different simultaneous recording of the same scene.

Finally, there is provided, in accordance with an embodiment of the invention, a method implementable on a computing device which includes generating a super resolution version of a single input audio signal by exploiting recurrence of data from the single input audio signal in at least one scale of either the single input audio signal or at least one reference audio signal to recover at least high frequency information.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
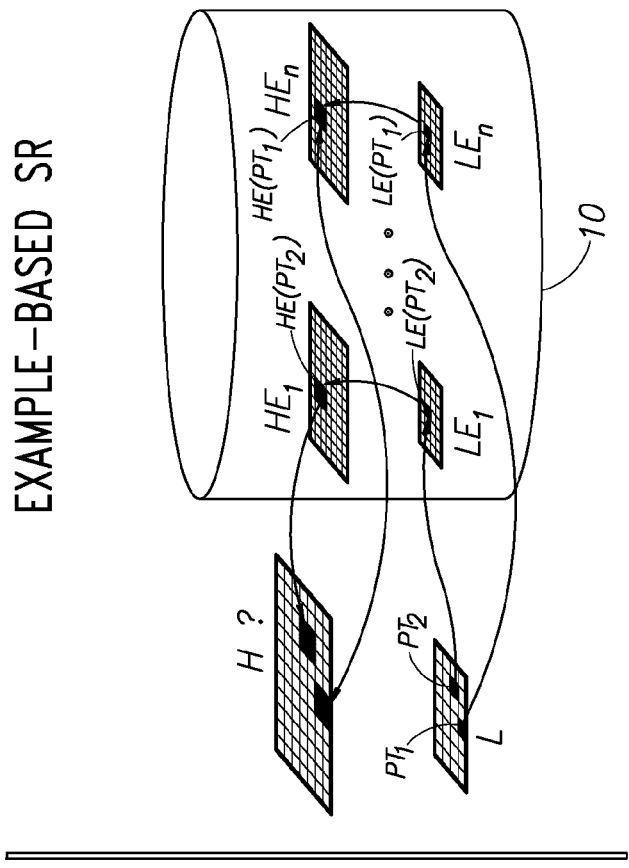
FIG. 1 is a schematic illustration of prior art super resolution methods.
Figure 1:
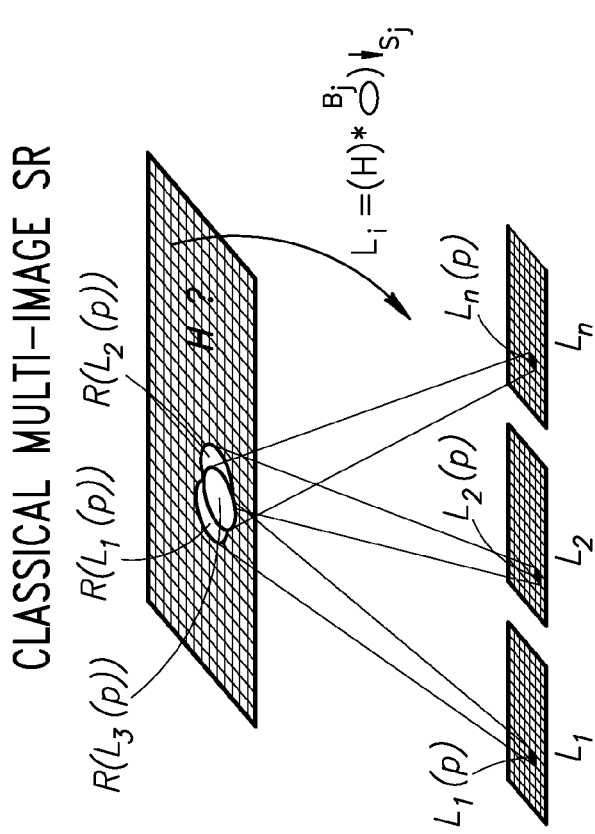

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the invention may be practiced without these specific details. In other instances, well-known methods, procedures, and components have not been described in detail so as not to obscure the invention.

Applicants have realized that single images contain high resolution information in them and that there is no need to refer to an external database for the high resolution information. Applicants have observed that small patches repeat many times in the images, both within scale (i.e. the same image scale as the input image) and across scale (i.e. from scales other than that of the input image). This redundancy may be exploited for all types of visual items.

For simplicity of discussion, the disclosure begins by describing the method on images. However, it will be appreciated that the invention may be implemented on all types of visual items as well as other types of signals.

Figure 2:
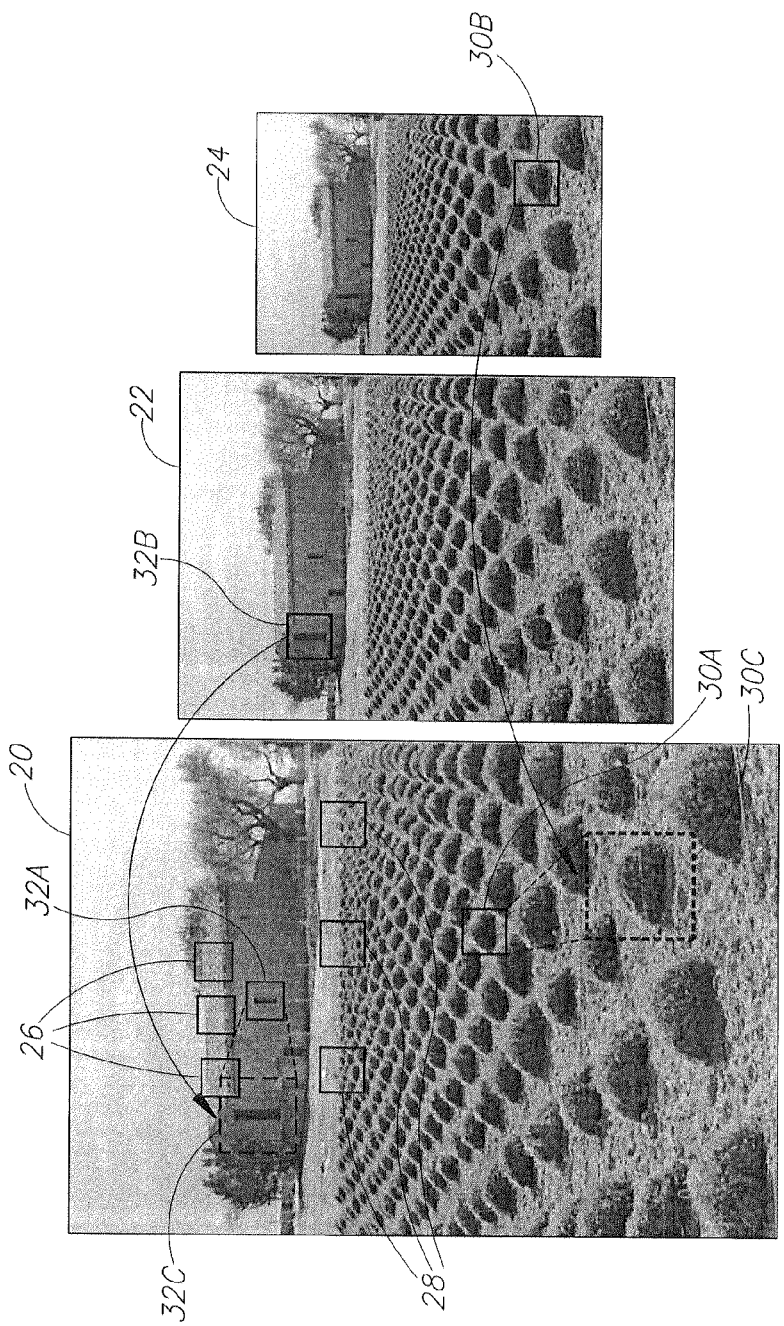
FIG. 2 is a set of three images, each image being a smaller version of its neighbor, showing data recurrence between the images.

Reference is now made to FIG. 2, which shows an input image 20 and two lower resolution versions of it, images 22 and 24. Applicants have realized that small patches repeat themselves elsewhere in an image, often at subpixel misalignments. For example, in image 20, various patches 26 of the roof of the building are very similar and various patches 28 of the field are also very similar. Patch recurrence within the same image scale may be utilized for classical super-resolution, particularly since the similarity may be at sub-pixel shifts.

However, Applicants have also realized that patches repeat not only within the same image scale, but also across different scales. For example, patch 30A repeats as patch 30B in lower resolution image 24 and patch 32A matches patch 32B in lower resolution image 22. Such repetitions may also be found under a transformation (e.g., rotation, reflection, affine, etc.).

The B patches 30B and 32B match the A patches, but correspond to other parts of input image 20. Thus, patch 30C which is a high resolution version of patch 30B may also serve as a high resolution version of 30A. Similarly, patch 32C is the high resolution version of patch 32B and may be used as a high resolution version of patch 32A. The B and C patches may now provide high resolution and low resolution pairs of patches which may be utilized in example-based super-resolution to determine the super resolution version of the A patches.

It will be appreciated that, with the within scale and across scale patch similarities, the invention may create a high resolution image from a single image, without using any external information, such as an external database or prior examples. As will also be discussed hereinbelow, it may also be applicable to spatial or temporal resolution enhancement of video sequences, of single dimensional signals, such as audio or speech, and of multi-dimensional signals.

Figure 3:
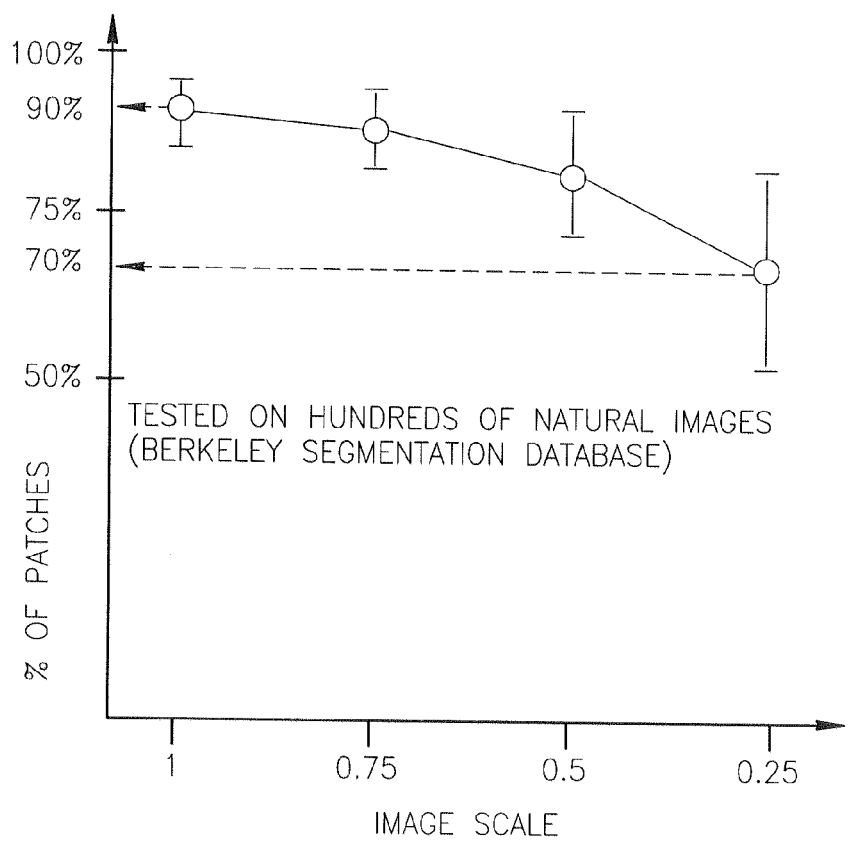
FIG. 3 is a graph of the extent of data recurrence in a standard image database.

Reference is now briefly made to FIG. 3, which illustrates how much patch redundancy there is within natural images. Over hundreds of natural images in the Berkeley Segmentation Database, the number of patches which have at least 10 similar patches (the notion of similarity is discussed below) is over 70%, even in a significantly reduced image of 0.25 of the original image. This holds true even when areas of uniform color (such as a blue sky) are removed. In the original image, about 90% of the patches have at least 10 similar patches. Thus, as argued above, the repetition of patches within and across scales may be utilized to generate a super-resolution version of the original image.

The patches may be of any size, but small image patches (e.g., 5×5 pixels) in a natural image tend to redundantly recur many times inside the image. For example, 5×5 is the patch size used to produce the statistics in FIG. 3.

Patch similarity may be measured by defining a distance between patches. For example, a Gaussian-weighted SSD (sum-of-squares distance) may be utilized. Note that textured patches tend to have much larger SSD errors than smooth (low-variance patches) when compared to other very similar-looking patches (especially in the presence of inevitable sub-pixel misalignments). To neutralize this, a distance threshold may be defined for each patch by measuring the Gaussian-weighted SSD distance w of the patch to a slightly misaligned copy of itself (by 0.5 pixel). For the statistics shown in FIG. 3, patches with a distance w below this threshold are considered similar to the source patch.

When searching for patches, it is possible to search amongst patches as is or to search in a manner which is invariant to different properties which may not be important for the high resolution information. Thus, for example, the method may search amongst patches which have had their mean values subtracted, thus achieving invariance to the mean color of the patch. Any other kind of low pass filtering may be applied to the patches before searching for matches.

Figure 4A:
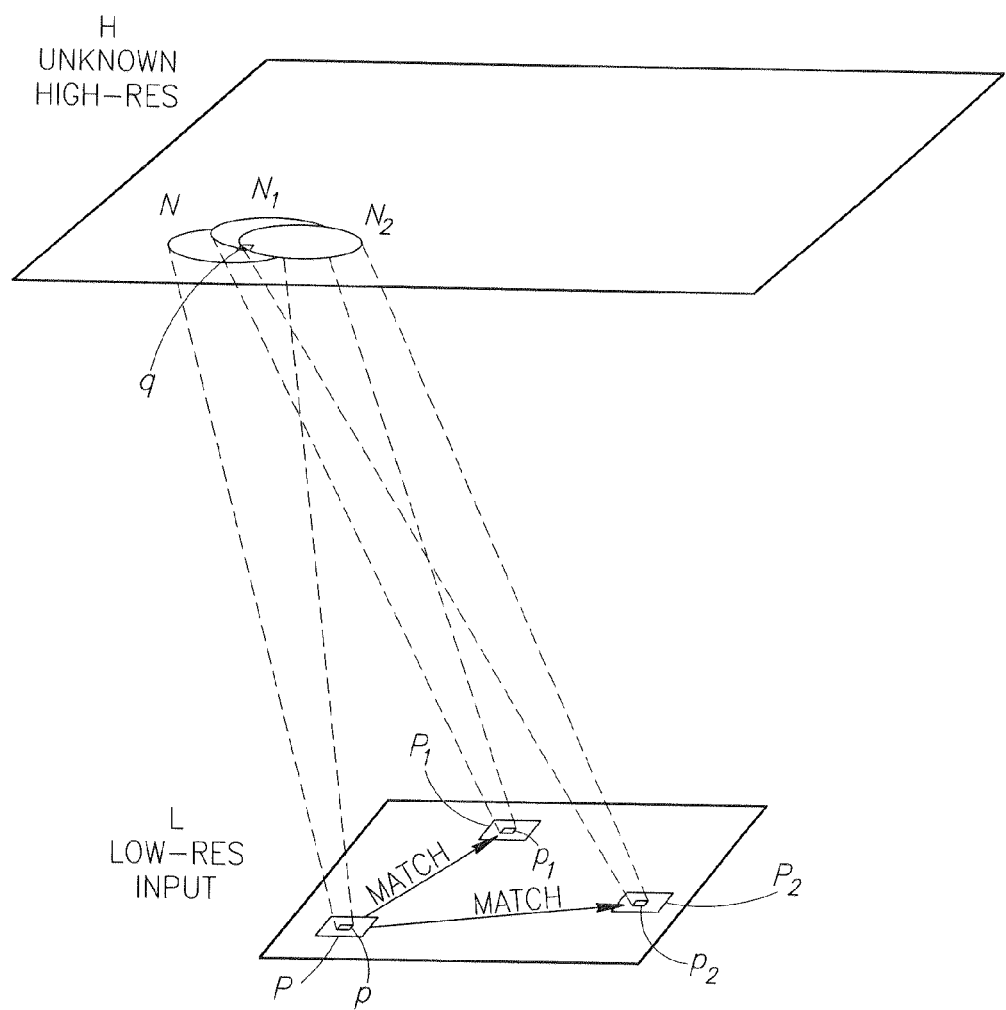
FIGS. 4A and 4B together are schematic illustrations of a super resolution method, constructed and operative in accordance with an embodiment of the invention.
Figure 4B:
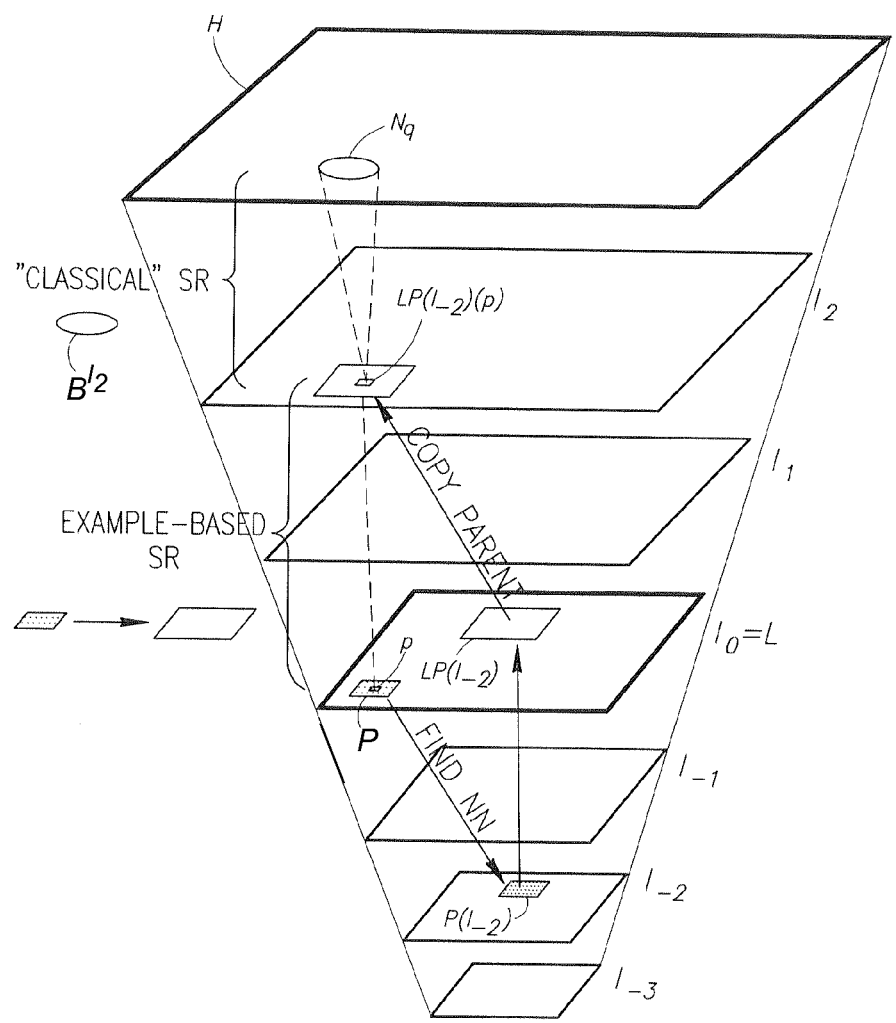

Reference is now made to FIGS. 4A and 4B which, together, illustrate a novel super-resolution method, constructed and operative in accordance with an embodiment of the invention. FIG. 4A illustrates a within scale part of the method utilizing patches from the same scale and FIG. 4B illustrates an across scale part utilizing patches from different scales.

In FIG. 4A, an exemplary calculation for a main pixel p is shown. First, patches similar to patch P around pixel p are found within the input, low-resolution image L. Two exemplary patches $P_1$ and $P_2$ are found, around pixels $p_1$ and $p_2$. Each one of these pixels provides a linear equation constraining the unknown pixel values in the high resolution image As can be seen, pixel p and each pixel p, induce one linear constraint on the unknown high-resolution intensity values within a local neighborhood N or $N_i$ respectively around high-resolution pixel q (which is the pixel in the high resolution image corresponding to pixel p), where the size of the local neighborhood is determined by the "support" of the blur kernel B. Equation 2 (repeated here) defines the linear constraint:

$$L(p) = (H * B_j)(q) = \sum_{q_i \in Support(B_j)} H(q_i) B_j(q_i - q) \quad \text{Equation 2}$$

where $H(q_i)$ are the unknown high-resolution intensity values and $B_j$ is the same blur kernel B relating high resolution image H with low resolution L as before, but shifted according to the subpixel misalignment between patches P and $P_j$, determined during the match process.

FIG. 4B illustrates the across-scale part of the method of the invention. For this part, it is possible to imagine a plurality of unknown upscale images (images $I_1$ and $I_2$ are shown in FIG. 4B but many more are possible and are part of the invention) between input, low resolution image L (equivalent to image $I_0$) and output super-resolution image H. These upscale images have corresponding down-scale images $I_{-1}$ and $I_{-2}$ of input image L. The scaling factors may be any scaling factor, such as 1.25, 2, 3, etc. The different scaling factors can be chosen arbitrarily, or they can be uniformly spaced e.g. $2^{(1/3)}$, $2^{(2/3)}$, 2.

Each upscale image has its own blur kernel $B^{ij}$, which may be more compactly supported (i.e. have a smaller spread), than the point spread function for input image L. It will be appreciated that the blur kernels $B^{ij}$ for the across-scale part of the method compensate only for the residual gap in scale between the resolution level of the upscale image and the final resolution level of the target high-resolution image H. The blur kernels $B^{ij}$ may be approximated as a Gaussian function.

The across-scale part of the method may search for matching patches in down-scale images $I_{-1}$ and $I_{-2}$ and may select the patch which matches best or may select any desired number k (k=1, 2, 3, . . . ) of good matches. FIG. 4B shows an example patch $P(I_{-2})$ which matches initial patch P, but was found in down-scale image $I_{-2}$. Matching patch $P(I_{-2})$ is a down-scale version of patch $LP(I_{-2})$ of input image L. Thus, matching patch $P(I_{-2})$ and its corresponding patch $LP(I_{-2})$ are a low-resolution/high-resolution pair of images, generated from single input image L. Accordingly, corresponding patch $LP(I_{-2})$ may be copied to upscale image $I_2$ at the location corresponding to the initial point p, as $LP(I_{-2})(p)$, in an operation similar to that of example-based super-resolution methods. Corresponding patch $LP(I_{-2})$ may be considered a "learned" patch.

However, upscale image $I_2$ is not the desired high resolution image H and thus, the method of the invention may solve for the residual scale gap, by implementing Equation 2 and using the $B^{I2}$ blur kernel, which kernel has a smaller spread than $B=B_L$, the kernel for input image L.

The method of the invention may search all of the downscale versions for matching patches using any appropriate nearest neighbor algorithm. Such an algorithm may be exact or may be approximate. Exemplary methods include the Approximate Nearest Neighbor search such as the article by S. Arya and D. M. Mount, "Approximate nearest neighbor queries in finite dimensions", in *SODA*, 1993, or the PatchMatch nearest neighbor search, such as described in the article by Connelly Barnes, Eli Shechtman, Adam Finkelstein, and Dan B Goldman entitled "PatchMatch: A Randomized Correspondence Algorithm for Structural Image Editing", *ACM Transactions on Graphics (Proc. SIGGRAPH)*, Vol. 28(3), August 2009.

A patch may be regarded as a very small image. Thus, methods for image-to-image alignment may be used to align image patches at sub-pixel accuracy (e.g., using the direct gradient-based methods described in the following articles: M. Irani, B. Rousso, and S. Peleg, "Computing Occluding and Transparent Motions", *International Journal of Computer Vision (IJCV)*, Vol. 12, No. 1, pp. 5-16, February 1994, and M. Irani and S. Peleg, "Motion Analysis for Image Enhancement Resolution, Occlusion, and Transparency", *Journal of Visual Communication and Image Representation*, Vol. 4, No. 4, pp. 324-335, December 1993, which methods bring images into alignment at high sub-pixel accuracy).

Another possible method to obtain patch matches at sub-pixel accuracy is to extract all the patches from the input image (input signal) at pre-determined sub-pixel (sub-unit) shifts, using interpolation. These extracted patches may serve as reference patches for matching to the original image (signal) patches, thus obtaining matches at sub-pixel (sub-unit) matches.

The method may then copy the matched patch to the associated upscale images and may solve for the residual scale gap (i.e. generate equation 2) from the upscale image, such as $I_2$ or $I_1$, to high resolution image H. If the downscale image is scaled down by the amount that image H is scaled up from input image L, then there is no residual scale gap and the matched patch may be copied directly to high resolution image H.

Alternatively, the method may utilize a multiple k of nearest neighbors, rather than the closest neighbor. For example, k may be 9.

It will be appreciated that, when searching for similar patches for example-based super-resolution, any measure of similarity may be utilized, and that the patches may be measured to be similar as is or under a parametric transformation, such as a rotation, a scale, a reflection, an affine rotation, similarity, affine, etc.

In one embodiment, the method may generate the multiple scales from the input image and may then search for input patches under various transformations in the various scales. Alternatively, it may transform the image using a range of transformations. For each transformed input image, it may generate a set of upscale/downscale images and may search for the input patches 'as is' in those scales.

It is also possible to search for matches in other transformations of the input images which are not necessarily geometric. Transformations can be applied to the color or intensity of the image or to any filtered version of the image. Patch similarity between patch P and patch $P_i$ may be computed using different similarity measures. One option is to use exp (beta*SSD) where SSD is the sum of squared differences between patch $P_i$ and patch P and beta is a negative scalar. A Gaussian weighted SSD may also be used.

The process described hereinabove, when repeated for all pixels in L, will yield a large collection of (possibly overlapping) suggested learned, intermediate-resolution patches LP(p) with a range of resolution levels between input image L and output image H. Each such "learned" patch LP(p) induces linear constraints on the unknown target image H.

It will be appreciated that the matches come from both within scale and across scales. This results in a large set of linear equations which may be solved simultaneously. It is also possible to use each component separately, i.e. rely only on within scale matches or only on across scale matches.

For increased numerical stability, each equation induced by a patch $P_i$ may be globally scaled by the degree of similarity of $P_i$ to its source patch P. Thus, patches of higher similarity to P will have a stronger influence on the recovered high-resolution image than patches of lower similarity. The process may then utilize standard linear equation solvers to solve a weighted linear set of equations to recover super resolution image H.

It will be appreciated that the closer the learned patches are to the resolution of target image H, the better conditioned the resulting set of equations may be.

If desired, the set of linear equations may be solved gradually, coarse-to-fine. Thus, the upscale (or intermediate) images may be recovered one at a time, from the lowest to the highest resolution. When solving the equations for an intermediate image, the process may utilize not only the low-resolution/high-resolution patch correspondences found in the associated low-resolution image, but also all of the newly learned patch correspondences from any previously recovered upscale images. The process may be repeated until the resolution level of target image H may be achieved.

A simplified reconstruction can also be performed without solving equations. Each intermediate level may be reconstructed by taking a weighted average of the overlapping example patches according to their degree of patch similarity. The weighting may also be influenced by the location of each pixel relative to the patch center.

Note that in the case when all the "learned" parent patches are copied to the highest resolution level, then the set of linear equations reduces to the trivial identity equations (or just to simple weighted averaging of overlapping parent patches). In such a case, there is no need to solve any equations in order to recover the high-resolution image, as it comes out trivially.

To further guarantee consistency of the recovered high-resolution results, when a new upscale image may be obtained, it may be projected back towards input image L (such as by blurring and subsampling) and then compared to input image L. Any large differences may indicate errors in the corresponding high-resolution pixels and may be "back-projected", as described in the article by Michal Irani and Shmuel Peleg, "Improving resolution by image registration", *CVGIP: Graphical Model and Image Processing*, Vol. 53, (3), 1991, pp 231-239, onto the upscale image to correct the errors. This process may verify that each newly recovered upscale image $I_1$, $I_2$ or H may remain consistent with input low resolution image L.

A simplified version of the coarse to fine calculation may be performed as follows. Sequentially, each intermediate image between the input resolution and the desired high resolution scale may be reconstructed by taking a weighted average of the overlapping learned patches according to their degree of patch similarity. The weighting may also be influenced by the location of each pixel relative to the patch center. Once the intermediate level is reconstructed, it may or may not be back-projected to the scale of the input image to correct errors. It may then be added to the database of example patches. Subsequent reconstructions may utilize it as examples.

Figure 5:
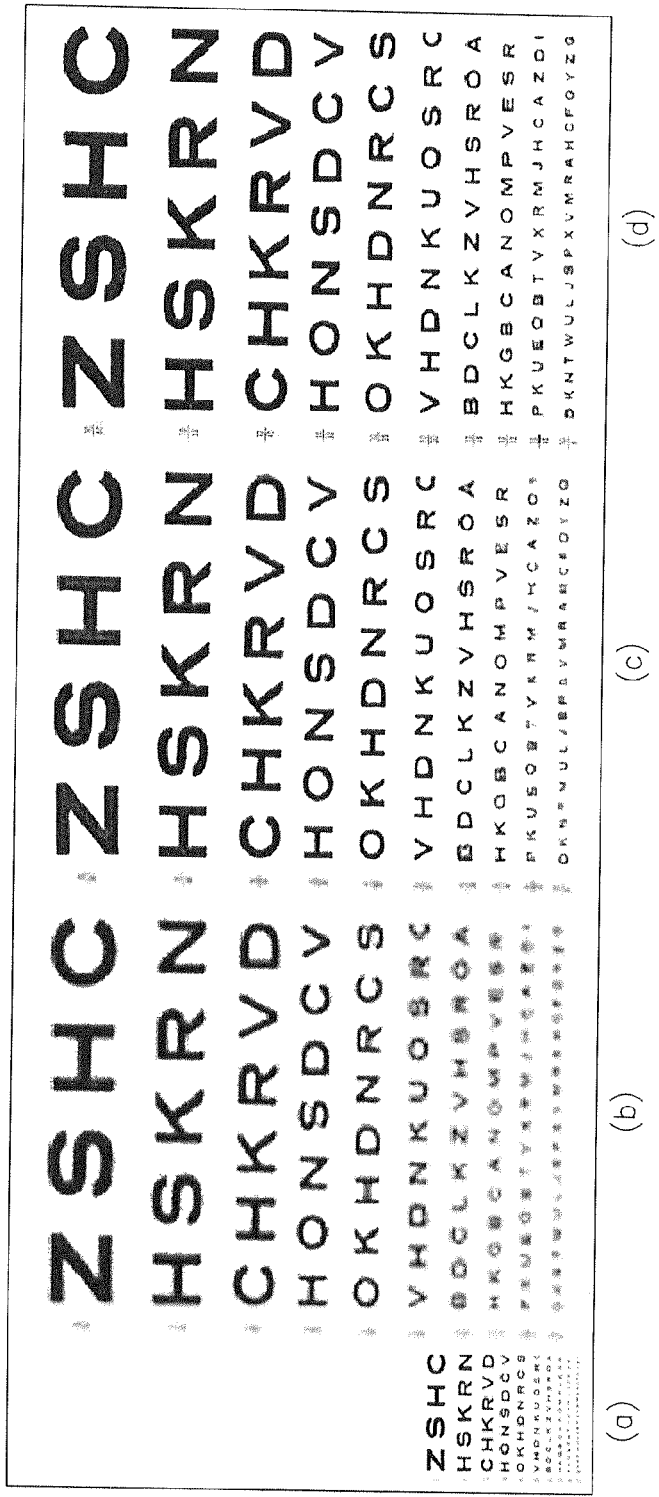
FIG. 5 is a set of four images, an input, low resolution image, a bi-cubic interpolation version, its super resolution version and the original image from which the low resolution image was taken.

Reference is now made to FIG. 5, which illustrates an exemplary result of implementing the present method on an image of an eye chart, shown as "(d) ground truth image". The input image (a) was a down-scaled (blurred and subsampled) version of (d), down-scaled by a factor of 3. Image (b) shows the result of a bicubic interpolation of the input image (a), a standard method of generating an upscaled image from a single input image. Image (c) shows the result of the present method.

Note the bottom part of image (c). The lines of letters have been recovered quite well, especially when compared with image (b), due to the existence of cross-scale patch recurrence in those image areas. However, the small digits on the left margin of the image could not be recovered, since their patch recurrence occurs only within the same (input) scale.

It will be appreciated that the main improvement in resolution comes from the addition of the example-based component to the super resolution operation. However, the classical-super resolution component plays a central role in preventing the example-based super resolution component from hallucinating erroneous high-resolution details (a problem alluded to by the article by Freeman, William T., Jones, Thouis R. and Pasztor, Egon C. entitled "Example-Based Super-Resolution" in *IEEE Comput. Graph. Appl.*, Vol 22, 2002, pp 56-65).

It will be appreciated that the super resolution method of the invention may be equivalently posed as optimizing an objective function with a "data-term" and two types of "prior-terms": The data-term may stem from the blur and subsample relation of the classical super resolution between high-resolution image H and low-resolution image L. The example-based super resolution constraints form one type of prior term and the multiple patches of the classical super resolution constraints form another type of prior term (at sub-pixel accuracy). The high-resolution image H which optimizes this objective function must satisfy both sets of constraints simultaneously. Similarly, a simpler objective function may be posed and optimized when using only a subset of the above-mentioned priors (e.g., only the data term+the example-based prior).

It will be appreciated that the invention may be applied in other contexts of super resolution. For example, in accordance with an embodiment of the invention, example-based cross-scale constraints may be added to classical super resolution of multiple low-resolution images of the same scene. Similarly, existing example-based super resolution methods which work with an external database may be extended by adding the unified super resolution constraints described hereinabove.

Moreover, this approach may be applied to provide super resolution of video data. It may be used for spatial super resolution of video frames (i.e., improving the spatial resolution of video frames by increasing the spatial sampling rate), and/or for temporal super resolution of the video data (i.e., increasing the frame-rate of the video sequence by generating new in-between frames. This may be done, e.g., by using recurrence of space-time patches within the video data, within and/or across spatial and/or temporal scales). This, again, may be done with or without additional external data, or additional video sequences. The result may be super-resolution from a single video sequence.

It will also be appreciated that the invention may be modified for spatio-temporal super resolution of video data. This embodiment may use a database of low-resolution/high-resolution pairs of space-time patches to increase the spatial resolution, the temporal resolution or both of them for the input video sequence. For example, this embodiment of the method may search for a good match to a query patch amongst the low-resolution patches in the database. The corresponding high resolution patch may provide information about the form of the high resolution video at the query location. In an embodiment, the low-resolution/high-resolution space-time patches may be taken from any video sequence or sequences and may be stored in the database. Moreover, additional pairs may be added to the database by extracting low-resolution/high-resolution patches from the input sequence and scaled versions of the input sequence where the scaling may be in space in time or in both.

The space-time patches may have different dimensions along x, y, and t (time). They may be small space-time patches (e.g., 5×5×5), or space-time chunks of a few full consecutive video frames (i.e., space-time patches of N×M×t), or may have only a temporal component (i.e., depicting the temporal behavior of a single pixel over time, which corresponds to a space-time patch of 1×1×t), etc. A space-time patch may be regarded as a small video sequence. Thus, methods for sequence-to-sequence alignment may be used to align space-time patches (e.g., using the method of U.S. Pat. No. 7,428,345, which is incorporated by reference, which brings video sequences into alignment in space and in time at high sub-pixel and sub-frame accuracy).

It will be appreciated that the method of the invention may be utilized to create a slow motion sequence which displays events that occurred faster than the original frame-rate, and thus are not visible in the original video. This may eliminate motion aliasing, such as the Wagon Wheel Effect. Temporal super resolution may enable new higher temporal frequencies (beyond the limit defined by the Nyquist frequency of the original frame-rate) to be recovered. This is possible by exploiting internal temporal redundancy at sub-frame displacements within the same temporal scale, or by 'learning' the extra missing high-frequency information by exploiting space-time redundancy across other temporal scales of the same input video.

Temporal super-resolution may also be utilized to remove temporal aliasing (such as motion aliasing, as discussed hereinabove, or intensity aliasing, and/or for decreasing motion blur. In the invention, the reduction of motion blur occurs without having to know or estimate the motion of the moving objects.

The invention may also be utilized to improve digital to analog video converters (DACs). Existing DACs use various interpolation methods in order to generate the continuous output signal. However, they do not recover the lost high frequencies which, as described hereinabove, are recoverable with the invention. An improved video DAC may implement the super resolution method described hereinabove to increase the resolution of the digital signal prior to creating the continuous signal, thereby adding denser sampling points while recovering missing high temporal frequencies.

The invention may also transform a video sequence from one frame-rate to another, such as is necessary when changing formats (e.g., PAL to NTSC, and vice versa), or when changing devices/displays, some of which have a specific frame-rate (various TVs, mobile phone, computer screens, digital screens, analog screens, etc.).

The aspect ratio of an image or a video sequence may be changed by increasing the sampling rate more in one dimension than in the other and/or by looking for example patches in lower scales with different x-scale factors, y-scale factors, and/or t-scale factors.

It will be appreciated that the invention may be applied to 1-D signals, 2-D signal, 3-D signals and N-dimensional signals for N>3. It may also be applied to different kinds of signals such as audio, general visual data, video, images, fMRI, ultrasound, medical data, CT, MRI, PET, radar, biological data, etc. The different scales may be spatial scales, or temporal scales, or different scales along any dimension in an N-dimensional signal.

Similarly, the increase in resolution may be along any of these dimensions: spatial super resolution, temporal super resolution, or super resolution in any dimension in an N-dimensional signal. The patches searched may be either spatial image patches of spatio-temporal video patches, or N-dimensional signal patches.

The above algorithm and the patches used may be applied within a variety of different data representations. These include (but are not limited to) scaled versions of the same image, a Gaussian pyramid (but with arbitrary scale factors, and not necessarily by a factor of 2), a Laplacian pyramid (arbitrary scale factors), Gradient pyramid, first and/or second directional derivatives, or any other descriptor types (e.g., SIFT, etc.).

The scale may be changed along any appropriate direction present in the input signal. In an image, the scales may be spatial. However, for a video sequence, the scales may be spatial or temporal or spatio-temporal. Similarly for N-dimensional signals.

The scale gap between successive scales (up and down) may be uniform. Alternatively, there may be general and arbitrary scale ratios relative to the input image. These ratios may be dyadic (powers of 2) or non-dyadic.

The above algorithm may be applied to color data in a variety of possible ways. In one embodiment, the super resolution operation may be performed on the intensity component only (i.e. the image may first be transformed from the standard RGB representation to the YIQ representation) and the super resolution operation may be applied to the Y (intensity) channel only. The method may then interpolate (such as via a bi-cubic interpolation) the chromatic and illumination components (which are generally characterized by low frequency information) and may then recombine the results.

In another embodiment, the super resolution operation may be performed on each color band separately (in any color representation: RGB, YIQ, Lab, etc) and then the results may be combined.

In a further embodiment, the super resolution operation may be performed on the combined color patches (all 3 bands simultaneously), i.e., searching for nearest-neighbors on color patches.

In a still further embodiment, the nearest-neighbor search in the illumination component may guide the super resolution in all three color components. Thus, the method may first search using the Y channel patches and may use the indices of the resulting matches to perform super resolution on the other color channels.

In a further embodiment, super resolution may be utilized to obtain high dynamic range, high-resolution of color information. In this embodiment, the patch search may be implemented in multiple intensity/color scales. Different scales in the intensity/color domain correspond to different degrees of intensity/color quantization. Exploiting low-res/high-res pairs of patches obtained from different intensity/color scales provides examples for recovering high-resolution information in the intensity/color domain. In addition, patches may be combined that are offset by fractions of color units or fractions of intensity units. The result is an extension of the dynamic range of a single image by exploiting internal data redundancy within and across color/intensity scales.

This idea may be applied to a single input image using internal data redundancy, or exploiting external data redundancy relative to an external database of examples of images of a different scene.

In a further embodiment, the blur function may be estimated from the data itself, by computing the mapping between repetitive patterns of different scale within the data. For example, if a patch $P_0$ in input image L has a similar patch $P(I_{-2})$ in down-scale image $I_{-2}$, then a more accurate blur function relating these two scales may be estimated directly from the relation between the high-resolution parent $LP(I_2)$ and patch $P_0$.

It will be appreciated that the invention may generate super-resolution by combining high-resolution information from two or more scales of at least one image. The high resolution information may include high-frequency information, which typically increases the quality of the image.

The method may exploit internal data redundancy across at least two scales, which may be the input scale ("within scale"), or any other scales of the image ("across scale"). For examples, the two scales may be the input scale and another scale (using similarity "within and across scales"), or just two different low-resolution scales extracted from the image. The method may be implemented with or without the classical super-resolution constraints that exploit redundancy within the same scale and with or without solving sets of equations.

Combining high-frequency information obtained from two or more different scale gaps allows recovering high-frequency information that is not fully contained in any of the individual scale-gaps. This happens in cases when the vanishing frequencies of the blur functions relating these different scale gaps, are different. This is particularly important in the case of temporal super resolution in video, where the blur function is the exposure time of the video camera, which is shaped like a Rect function. Its Fourier transform is a Sinc function, which has multiple vanishing frequencies. Different exposure times (different Rects) will have different Sinc functions. If there are scale gaps whose Rects have different well-separated vanishing frequencies, new high frequency information may be recovered that is not fully contained in any of the individual scales.

This may be possible with different scales of the input image (as discussed hereinabove), or with multiple scales from within an external database image. Alternatively, classical multi-frame super resolution methods may be extended to use also example-based information obtained from other scales of the input images. This may add more equations or information learned from self-similarities across scales within the input images (or within an external database of images).

The high-frequency information may be combined from the different scales with or without solving equations. It may be combined by solving linear sets of equations (as described hereinabove), or by a simple weighted average of the information of the patches obtained from the different scales (e.g., by averaging the patch information, or by averaging only the high-frequency details of the patches, or by incorporating these into the Markov Random Field used by Freeman et al., etc.). The weights may be according to any appropriate measure, such as according to the degree of similarity of the Nearest-Neighbor patches found, according to pixel position within the patch, etc.)

It will be appreciated that the invention may utilize examples from at least one scale gap relative to the input image which is different from the scale gap S between the input and the output images. This enables the invention to find similarities in other image scales which are not found in the 1/S image scale. An example of this may be seen in FIG. 6, to which reference is now made.

Figure 6:
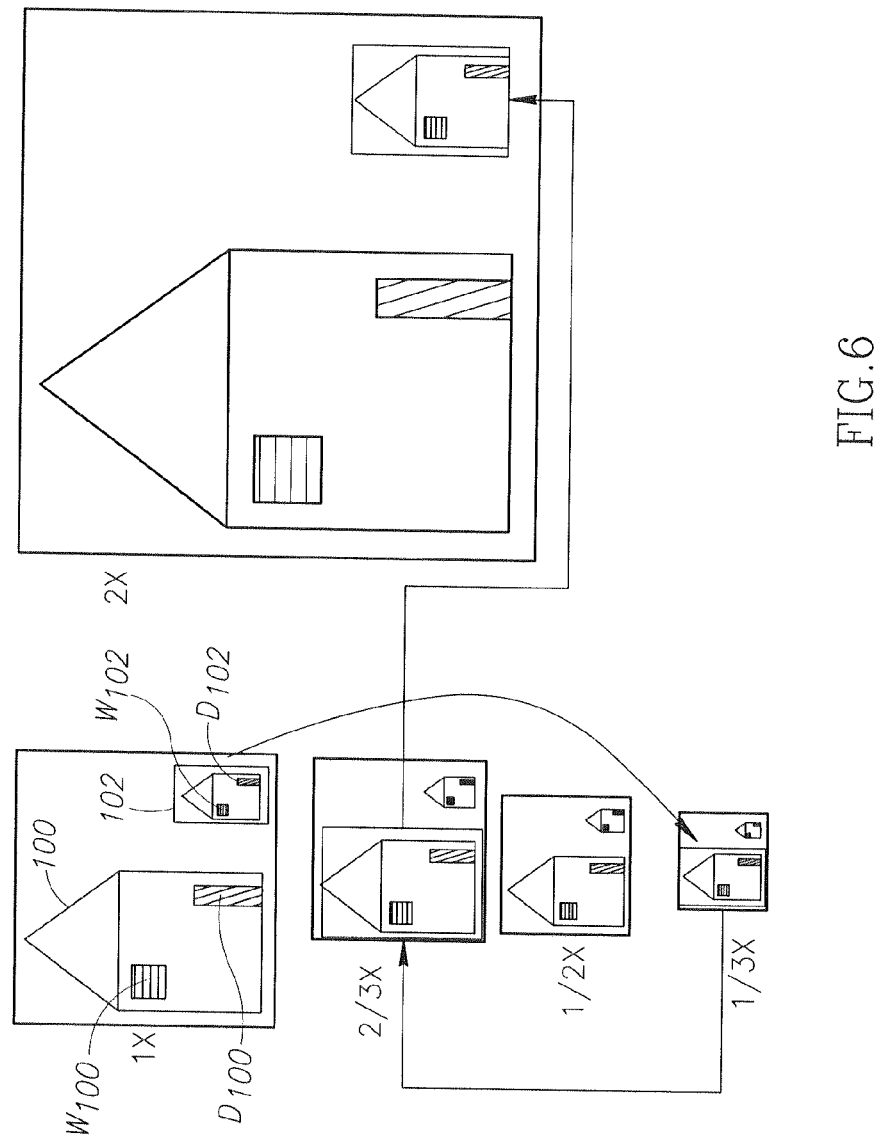
FIG. 6 is a schematic illustration of different images and different scale factors as used in the present invention.

FIG. 6 shows an image of a large house 100 and a small house 102, about ⅓ the size of large house 100. Each house has one window W and one door D. The door of small house 102 is labeled D102 and the window of large house 100 is labeled W100.

When magnifying the image by a factor of 2, previous methods will look for a match for the small house (or its smaller patch components) in ½ of the original scale. However, none of the houses in that image scale match properly to the ⅓ sized house 102 and, thus the patch matching will fail at that level. The correct match for the small house can be found only at ⅓ of the image scale (the image labeled ⅓x), where it will match a smaller version of the larger house (i.e. its smaller patches will find a good match). The corresponding high-resolution examples will be extracted from the 2×⅓=⅔ scale and copied to the output at the appropriate location.

Simple interpolation will fail because the fine texture of the window and door of the small house in the input image are beyond the limit defined by the Nyquist frequency of the input sampling.

In an alternative embodiment of the invention, only the extra high-frequency details of a "learned" patch at the relevant frequency bands may be added. For this, any high pass filter, such as a Laplacian of the patch, may be performed on the patch before adding the patch into its upscale image. Another exemplary high pass filter may be to add only the difference between the learned patch and the low-resolution patch.

To generate the different image scales, the images typically are blurred and then subsampled. In an alternative embodiment, the images may just be blurred. In this embodiment, the low-res/high-res pair may be of the same size, but one may be blurry and one may be sharp. The input image L may then be increased to the output size by simple interpolation, to generate an initial high resolution image H'. The method may then utilize the interpolated blurry patches of H' as low-resolution patches to be searched for in the low-resolution/high-resolution pairs. Once a matching low-resolution patch is found in the examples, its corresponding sharp patch (the 'learned' high-resolution patch) may be copied to the appropriate position in the output image H (or just its extra high-frequencies may be added to the blurry output image H'). As before, the patches may be copied and multiple overlapping patches may be averaged, or they may induce additional equations according to the blur function which may be further solved.

The method may also be used to perform "example-based deblurring" (spatial deblurring, motion deblurring, etc.) by generating multiple scales of increasingly blurrier images/videos (blurring in space or in time). For example, example-based motion deblurring in video sequences may be obtained even without increasing the frame-rate. Imagine a video sequence with a rotating fan, which starts rotating slowly and gradually increases its speed. The frames of the slow-rotating fan may serve as sharp examples for the frames with the blurry fast rotating fan.

In an alternative embodiment, the method of the invention may provide super resolution of audio data. It may be used to improve the temporal resolution of recorded audio tracks, by increasing the sampling rate while recovering new higher temporal frequencies. The method may utilize recurrence of temporal patches within the input scale of the audio track and/or in different temporal scales of the audio track. The method may utilize external audio data, or additional audio tracks, if desired.

Super resolution of audio tracks may be utilized for an audio digital to analog converter (DAC). The conversion may be done by using the output of a super resolution algorithm, such as the one described hereinabove or any other super resolution method, applied to the input audio track, as part of a digital to analog converter. This may be utilized for digital music players, PC-sound card, and hi-fi systems, etc.

The super resolution of audio tracks may be utilized to change the temporal sampling rate of the signal when changing from one digital device (or format) to another. This requires adding new samples according to the correct high temporal frequencies (higher than the limit defined by the Nyquist frequency of the input sampling rate) that are not recoverable by regular temporal interpolation.

In accordance with an embodiment of the invention, all of the above ideas may be used for advanced image, video, and audio compression. For example, the super resolution may be utilized to decompress an image compressed with any standard compression algorithm, thereby to recover the high-resolution image. In addition, if needed, on the decoding side and prior to transmitting, the decoder may generate the super resolution image and may compare it with the true original image. Sections of large reconstruction error may be further corrected by sending extra bits.

A similar operation may be performed for a video sequence, in space and/or in time. In particular, a lower frame-rate video may be transmitted by sampling the frames (with or without temporal blur). The missing frames may be recovered on the decoding side using temporal super resolution. In addition, if needed, on the decoding side and prior to transmitting, the decoder may generate the super resolution video and may compare it with the original video. Sections of large reconstruction error may be further corrected by sending extra bits.

In a further alternative embodiment, the super resolution method may be used in the design of protocols for budgeted medical image acquisition to minimize radiation. Consider the process of scanning a 3 dimensional body with some medical imaging device such as a CT scanner. Such a scan is performed by taking a sequence of two dimensional slices of the body. The treating doctor would like to get the highest possible resolution within each slice as well as having the inter slice spacing as small as possible. However, higher resolution means longer scanning time, which incurs higher operation costs and is uncomfortable for the patient. Furthermore, longer scanning time corresponds to higher amounts of radiation being absorbed by the patient. Therefore, there is a tradeoff between scanning time and the resolution of the acquired image.

A budgeted acquisition protocol, where the budget may be set by the maximal amount of radiation that the patient may absorb, is generally desirable. The protocol ideally should be designed such that the resulting medical image has maximal resolution in the areas of interest. In accordance with an embodiment of the invention, the super resolution method of the invention may optimize this tradeoff and may enable the protocol to spend less time scanning areas (or directions) where there is higher potential for super resolution. For example, if it is known that the content of close slices along the slicing direction is very similar to one another, then lower resolution slices may be obtained and a super resolved version of each slice, using only data of the input image, may be generated using the data redundancy across slices.

Figure 7:
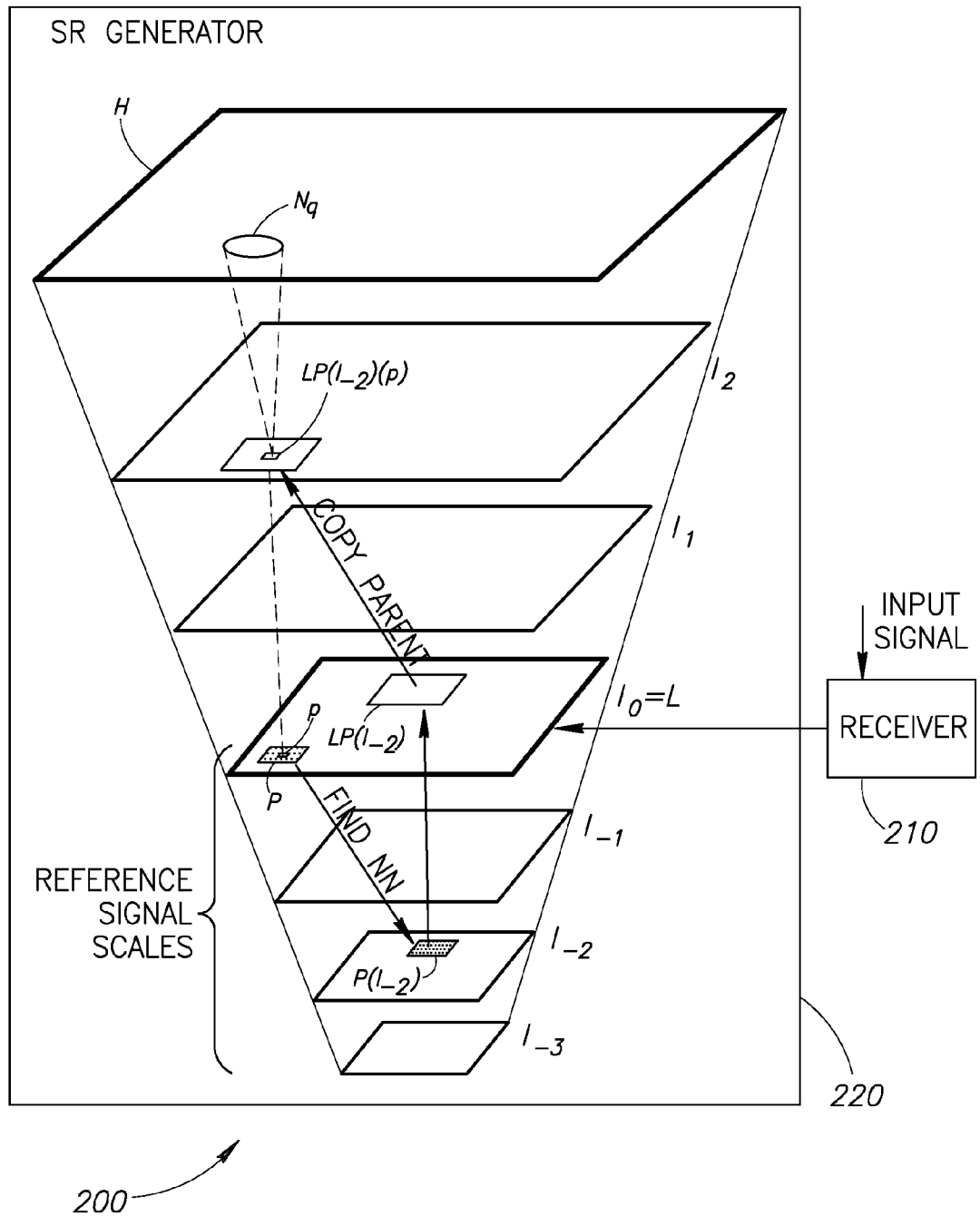
FIG. 7 is a schematic illustration of an apparatus for super resolution, constructed and operative in accordance with a preferred embodiment of the present invention.

Reference is now made to FIG. 7 which illustrates an apparatus 200, constructed and operative in accordance with a preferred embodiment of the present invention. Apparatus 200 comprises a receiver 210 to receive an input signal and a super resolution generator 220 to exploit recurrence of data from the input signal in at least two different scales, $I_0 L_1, L_2$, etc, of at least one reference signal. Generator 220 extracts and combines high frequency information from a plurality of scales of the at least one reference signal to generate a super resolution version of the input signal.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method implementable on a computing device, the method comprising:

exploiting recurrence of data from a single input signal in at least two different scales of at least one reference signal, to extract and to combine high frequency information from a plurality of scales of said at least one reference signal to generate a super resolution version of said single input signal, wherein said at least one reference signal is one of said single input signal and a transformed version of said single input signal.

2. The method according to claim 1 and wherein said transformed version of said single input signal is obtained by at least one of the following operations applied to said single input signal: rotation, reflection, downscaling, upscaling, similarity transformation, affine transformation, projective transformation, a color transformation, an intensity transformation, any geometric transformation, and any function applied to said single input signal.

3. The method according to claim 1 and wherein said at least one reference signal is an intermediate resolution signal obtained as an intermediate result from said single input signal.

4. The method according to claim 1 wherein said signals are at least one of the following types of signals: an image and a video sequence.

5. The method according to claim 1 wherein said signals are at least one of the following types of signals: an fMRI sequence, an audio signal, an ultrasound signal, MRI signal, CT signal, radar signal, range sensor signal, electrical signal, medical signal, and an N-dimensional signal (where N=1, 2, 3, 4, . . . ).

6. The method according to claim 1 wherein said exploiting comprises using patches to find repetitive patch information.

7. The method according to claim 6 and wherein said patch information is at least one of the following: patch colors, patch intensities, patch Laplacians, high-pass filtered versions of the patch, low-pass filtered versions of the patch, band-pass filtered versions of the patch, patch descriptors and any function applied to the patch.

8. The method according to claim 6 wherein said patches are smaller in at least one dimension than said single input signal.

9. The method according to claim 6 wherein said patches are at least one of the following: image patches, spatio-temporal video patches, spatial video patches, temporal video patches, and n-dimensional signal patches in an N-dimensional signal (where N=1, 2, 3, 4, . . . and n≤N).

10. The method according to claim 1 wherein each of said at least two scales is at least one of the following: a spatial scale, a temporal scale, a scale along a dimension in an N-dimensional signal, a color scale, an intensity scale, a dynamic range scale and a spectral range scale.

11. The method according to claim 1 and wherein said exploiting utilizes data recurrence within the input scale of said single input signal and across at least one scale downscale from said input scale.

12. The method according to claim 1 and wherein said super-resolution provides an increase in resolution in at least one of: spatial resolution, temporal resolution, color resolution, intensity resolution, dynamic range, spectral range and at least one dimension of said single input signal.

13. The method according to claim 1 and wherein said super-resolution version of said single input signal is used for at least one of the following applications: signal up-sampling, digital zoom-in, viewing in slow-motion, increasing dynamic-range, changing aspect ratio, changing frame-rate, as part of digital-to-analog conversion, image compression, signal compression, video compression, guided signal acquisition to maximize resolution after processing, guided acquisition of medical signals to decrease radiation, signal format conversion, extracting new samples of said single input signal, reducing blur and reducing aliasing.

14. A method implementable on a computing device, the method comprising:
exploiting recurrence of data from a single input signal in at least two different scales of at least one reference signal, to extract and to combine high frequency information from a plurality of scales of said at least one reference signal to generate a super resolution version of said single input signal,
wherein said at least one reference signal is one of said single input signal and a transformed version of said single input signal,
and wherein at least one of said different scales has a scale gap relative to the input scale of said single input signal which is different than the scale gap between said input scale and the output scale of said super-resolution version of said single input signal.

15. A method implementable on a computing device, the method comprising:
exploiting recurrence of data from a single input signal in at least two different scales of at least one reference signal, to extract and to combine high frequency information from a plurality of scales of said at least one reference signal to generate a super resolution version of said single input signal,
wherein said at least one reference signal is one of said single input signal and a transformed version of said single input signal,
and wherein at least one of said different scales has a non-dyadic scale gap relative to the input scale of said single input signal.

16. A method implementable on a computing device, the method comprising:
exploiting recurrence of data from a single input signal in at least two different scales of at least one reference signal, to extract and to combine high frequency information from a plurality of scales of said at least one reference signal to generate a super resolution version of said single input signal,
wherein said at least one reference signal is one of said single input signal and a transformed version of said single input signal,
and wherein said exploiting comprises:
for each input patch in at least a part of said single input signal, finding at least one matching patch within a plurality of scaled versions of said single input signal; and
solving for a high-resolution signal comprising:
recovering intermediate-resolution details of at least one intermediate up-scaled version of said single input signal, said details being extracted from at least one higher-scale parent patch of at least one of said matching patches; and
bridging the gap between said intermediate-resolution scale and a high-resolution scale of said high-resolution signal.

17. The method according to claim 16 and also comprising transforming at least one of said patch and said at least one matching patch as part of finding similarity of patch information.

18. The method according to claim 17 and wherein said transforming comprises performing at least one of the following transformations: rotation, translation, reflection, scaling, similarity, affine and projective, color transformation and intensity transformation.

19. The method according to claim 16 and wherein said details are at least one of: said parent patch, a Laplacian of said parent patch, a high-pass filtered version of said parent patch, a weighted average of a plurality of parent patches, a weighted average of a plurality of filtered versions of parent patches, colors of said parent patch, intensities of said parent patch and a band-pass filtered version of said parent patch.

20. The method according to claim 16 and wherein said bridging comprising solving equations relating said high-resolution scale to said intermediate-resolution scale.

21. The method according to claim 10 and comprising weighting each of said equations according to the degree of similarity of said input patch to said matching patch.

22. The method according to claim 16 and wherein said high-resolution signal is one of the following: said super-resolution version of said single input signal and an intermediate-resolution version of said single input signal between the scale of said single input signal and the scale of said super-resolution version of said single input signal.

23. The method according to claim 16 wherein said exploiting comprises coarse-to-fine repetitions of said finding and solving, wherein the scale of said high-resolution signal ranges from the input scale of said single input signal to the scale of said super-resolution version of said single input signal, and wherein at each said repetition, said high-resolution signal is added to said at least one reference signal.

24. The method according to claim 16 and wherein said intermediate-resolution scale is said high-resolution scale.

25. The method according to claim 10 and wherein said equations are a function of a blur kernel associated with the scale gap between said high-resolution scale and said intermediate scale.

26. The method according to claim 15 and wherein said equations are a function of a residual sub-unit misalignment in at least one dimension between said input patch and said at least one matching patch.

27. The method according to claim 15 and wherein said blur kernel is one of the following: a point spread function of a sensor, a Gaussian blur, a low-pass filter and an exposure-time function of a video camera.

28. The method according to claim 15 and also comprising estimating said blur kernel from matched patches across scales.

29. The method according to claim 16 and wherein said finding comprises performing an approximate nearest neighbor search.

30. A method implementable on a computing device, the method comprising:
  generating a super resolution version of a single input video sequence in at least the temporal dimension, said super resolution version comprising a video sequence having an increased frame rate from generation of new in-between video frames,
  wherein said new in-between video frames are generated by exploiting recurrence of space-time patches from said single input video sequence in at least one of said single input video sequence and a transformed version of said single input video sequence.

31. The method according to claim 30 and wherein said generation of new in-between frames reduces at least one of: motion aliasing and motion blur.

32. The method according to claim 30 and wherein said super-resolution version of said input video sequence is used for at least one of the following applications: frame rate conversion, as part of digital to analog conversion, video compression, temporal zoom-in, guided video acquisition to maximize resolution after processing, extracting new intermediate frames of said input video, reducing blur, reducing temporal aliasing and reducing motion aliasing.

33. The method according to claim 30 and wherein said super resolution version is a slow motion version.

34. The method according to claim 30 wherein said recurrence of space-time patches comprises at least recurrence of space-time patches across different temporal scales of said input video sequence.

35. A method implementable on a computing device, the method comprising:
  generating a super resolution version of a single input video sequence in at least the temporal dimension,
  wherein said generating comprises exploiting recurrence of data from said input video sequence in at least one scale of at least one reference video sequence to recover at least high temporal frequency information from said at least one reference video sequence and wherein said at least one reference video sequence is not obtained by a different simultaneous recording of the same scene.

36. The method according to claim 35 and wherein said at least one reference video sequence is said input video sequence.

37. The method according to claim 35 and wherein said at least one reference video sequence is a transformed version of said input video sequence, obtained by at least one of the following transformations in at least one dimension of at least one of space and time: rotation, reflection, downscaling, upscaling, similarity transformation, affine transformation, projective transformation, a color transformation, an intensity transformation, any geometric transformation and a function applied to said input video sequence.

38. The method according to claim 35 and wherein said at least one reference video sequence is an intermediate resolution video sequence generated from said input video sequence.

39. The method according to claim 35 wherein said exploiting comprises using patches to find repetitive patch information.

40. The method according to claim 39 and wherein said patch information is at least one of the following: patch colors, patch intensities, patch Laplacians, filtered versions of the patch, patch descriptors, and any function applied to the patch.

41. The method according to claim 35 and wherein said at least one scale is at least one of: a spatial scale, a temporal scale, an input scale of said input video sequence, a color scale, an intensity scale, a dynamic range scale, a spectral range scale, and a non-dyadic scale gap relative to said input scale in at least one of space and time.

42. The method according to claim 35 and wherein said exploiting comprises:
  for each input patch in at least a part of said input video sequence, finding at least one matching patch within at least one of: said at least one reference video sequence and said scaled version of said at least one reference video sequence;
  and recovering at least high temporal frequency information from said matching patches to generate said super resolution version of said input video sequence.

43. The method according to claim 42 and wherein said recovering comprises extracting at least high temporal frequency information from at least one higher scale parent patch of said at least one matching patch.

44. The method according to claim 42 and wherein said recovering comprises finding said at least one matching patch at sub-frame misalignment accuracy and solving equations based on at least one of: said sub-frame misalignment and a blur function relating a high resolution scale to the scale of at least one of said input patch and said matching patch.

45. The method according to claim 42 and also comprising transforming at least one of said patch and said at least one matching patch as part of finding similarity of patch information.

46. The method according to claim 45 and wherein said transforming is at least one of: rotation, translation, scaling, reflection, similarity, affine, projective, color transformation, and intensity transformation.

47. The method according to claim 42 and wherein said finding comprises performing an approximate nearest neighbor search.

48. The method according to claim 35 and wherein said super-resolution version of said input video sequence is used for at least one of the following applications: slow motion, frame rate conversion, as part of digital to analog conversion, video compression, temporal zoom-in, guided video acquisition to maximize resolution after processing, extracting new intermediate frames of said input video, reducing blur, reducing temporal aliasing and reducing motion aliasing.

49. Apparatus comprising:
  a receiver to receive a single input signal; and
  a super resolution generator to exploit recurrence of data from said single input signal in at least two different scales of at least one reference signal to extract and to combine high frequency information from a plurality of scales of said at least one reference signal to generate a super resolution version of said single input signal,
  wherein said at least one reference signal is one of said single input signal and a transformed version of said single input signal.

50. Apparatus comprising:
  a receiver to receive a single input video sequence; and
  a super resolution generator to generate a super resolution version of said single input video sequence in at least the temporal dimension, said super resolution version comprising a video sequence having an increased frame rate from generation of new in-between video frames,
  wherein said generator generates said new in-between video frames by exploiting recurrence of space-time patches from said single input video sequence in at least one of said single input video sequence and a transformed version of said single input video sequence.

51. Apparatus comprising:

a receiver to receive a single input video sequence; and a super resolution generator to generate a super resolution version of said single input video sequence in at least the temporal dimension, said super resolution version comprising a video sequence having an increased frame rate from generation of new in-between video frames, wherein said generator generates said new in-between video frames by exploiting recurrence of data from said single input video sequence in at least one scale of at least one of: said single input video sequence and at least one reference video sequence which is not a different simultaneous recording of the same scene.

* * * * *